(12) United States Patent
Ye et al.

(10) Patent No.: US 12,175,621 B2
(45) Date of Patent: Dec. 24, 2024

(54) UNSUPERVISED DEFORMABLE IMAGE REGISTRATION METHOD USING CYCLE-CONSISTENT NEURAL NETWORK AND APPARATUS THEREFOR

(71) Applicant: Korea Advanced Institute of Science and Technology, Daejeon (KR)

(72) Inventors: JongChul Ye, Daejeon (KR); Boah Kim, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 793 days.

(21) Appl. No.: 17/365,598

(22) Filed: Jul. 1, 2021

(65) Prior Publication Data

US 2022/0005150 A1 Jan. 6, 2022

(30) Foreign Application Priority Data

Jul. 2, 2020 (KR) .................. 10-2020-0081299
Dec. 18, 2020 (KR) .................. 10-2020-0178169

(51) Int. Cl.
*G06T 3/14* (2024.01)
*G06N 3/045* (2023.01)
(Continued)

(52) U.S. Cl.
CPC .............. *G06T 3/14* (2024.01); *G06N 3/045* (2023.01); *G06N 3/088* (2013.01); *G06T 7/337* (2017.01);
(Continued)

(58) Field of Classification Search
CPC . G06T 3/14; G06T 7/337; G06T 2207/20081; G06T 2207/20084; G06N 3/045; G06N 3/088
See application file for complete search history.

(56) References Cited

PUBLICATIONS

Ruppel M, Persad R, Bahl A, Dogramadzi S, Melhuish C, Smith L. Nancy: Combining Adversarial Networks with Cycle-Consistency for Robust Multi-Modal Image Registration. International Journal of Computer and Information Engineering. Jul. 1, 2020;14(8):300-4. (Year: 2020).*

(Continued)

*Primary Examiner* — David Perlman
(74) *Attorney, Agent, or Firm* — ArentFox Schiff LLP; Joseph M. Maraia; Marlo Schepper Grolnic

(57) ABSTRACT

Disclosed are an unsupervised learning-based image registration method using a neural network with cycle consistency and an apparatus therefor. An image registration method includes receiving a first image and a second image for image registration, outputting a deformation field for the first image and the second image using an unsupervised learning-based neural network with cycle consistency for the deformation field, and generating a registration image for the first image and the second image based on a spatial deformation function using the output deformation field. The outputting of the deformation field includes outputting the deformation field for the first image for registering the first image to the second image may be output, when the first image is a moving image and the second image is a fixed image, and the generating of the registration image includes generating the registration image by applying the deformation field for the first image to the first image using the spatial deformation function.

9 Claims, 5 Drawing Sheets

(51) Int. Cl.
G06N 3/088 (2023.01)
G06T 7/33 (2017.01)
(52) U.S. Cl.
CPC .............. G06T 2207/20081 (2013.01); G06T 2207/20084 (2013.01)

(56) References Cited

PUBLICATIONS

Automatic Registration between Maxillofacial Cone-Beam CT and Dental Impression via Deep-Pose Estimation and Local Alignment Similarities, Feb. 2020, Seoul National University.
J. Kim et al., Wave Celerity Estimation using Unsupervised Image Registration from Video Imagery, Journal of KIISE, 46(12), Dec. 2019, pp. 1296-1303.
Boah Kim et al., "Unsupervised Deformable Image Registration Using Cycle-Consistent CNN", MICCAI 2019: Medical Image Computing and Computer Assisted Intervention—MICCAI 2019 pp. 166-174, Jul. 2, 2019 https://link.springer.com/chapter/10.1007%2F978-3-030-32226-7_19.

* cited by examiner

UNSUPERVISED DEFORMABLE IMAGE REGISTRATION METHOD USING CYCLE-CONSISTENT NEURAL NETWORK AND APPARATUS THEREFOR

CROSS-REFERENCE TO RELATED APPLICATIONS

A claim for priority under 35 U.S.C. § 119 is made to Korean Patent Application No. 10-2020-0081299 filed on Jul. 2, 2020, in the Korean Intellectual Property Office, the entire contents of which are hereby incorporated by reference.

BACKGROUND

Embodiments of the inventive concept described herein relate to an unsupervised learning-based image registration technology using a neural network with cycle consistency, and more particularly, to an image registration method capable of generating a registration image obtained by registering a moving image and a fixed image using an unsupervised learning-based neural network with cycle consistency and an apparatus therefor.

Image registration is to transform two different images into one coordinate system, and is used in various image processing fields such as computer vision and medical images. In particular, registration of medical images is an essential step in locating and diagnosing a specific lesion with respect to images taken over time. For example, in the case of diagnosis of hepatocellular carcinoma (HCC), CT images are taken at regular time intervals before and after infection of the contrast agent, the contrast of the images is checked, the cancer is diagnosed, and surgery or radiotherapy is planned. However, liver images taken at different phases are usually different in position and shape of anatomical structures of the images due to patient motion, disease progress, a patient's inhalation and exhalation, or the like. Therefore, image registration is very important to improve the accuracy of diagnosis and treatment.

The existing image registration method was developed to minimize an energy function through an iterative method for a deformation space. In particular, the diffeomorphic image registration method has been much researched for the preservation of topology of an original image and one-to-one mapping between a fixed image and a moving image. However, these approaches usually require substantial time and extensive computation.

Recently, as AI-based techniques show high performance in the image processing field, supervised learning/unsupervised learning-based research using deep neural networks (or deep artificial neural networks) is also being conducted in the image registration field. Here, the deep neural network provides a deformation vector field capable of deforming an image, and the final deformed image is generated by a differentiable interpolation technique such as a spatial transformer. Although the AI-based image registration technique has the advantage of having a short image registration time, there is a disadvantage that the constraint on the topology preservation of the original image is not clear. When the AI-based image registration technique is applied to an image with a large three-dimensional image size, such as a CT image, the registration performance is limited.

SUMMARY

Embodiments of the inventive concept provide an image registration method capable of generating a registration image obtained by registering a moving image and a fixed image using an unsupervised learning-based neural network with cycle consistency and an apparatus therefor.

According to an exemplary embodiment, an image registration method includes receiving a first image and a second image for image registration, outputting a deformation field for the first image and the second image using an unsupervised learning-based neural network with cycle consistency for the deformation field, and generating a registration image for the first image and the second image based on a spatial deformation function using the output deformation field.

The outputting of the deformation field may include outputting the deformation field for the first image for registering the first image and the second image may be output, when the first image is a moving image and the second image is a fixed image, and the generating of the registration image may include generating the registration image by applying the deformation field for the first image to the first image using the spatial deformation function.

The neural network may include a first neural network that generates a first registration image through the spatial deformation function by using a third image and a fourth image as inputs and outputting a deformation field for the third image, a second neural network that generates a second registration image through the spatial deformation function by using the third image and the fourth image as inputs and outputting a deformation field for the fourth image, a third neural network that generates a third registration image through the spatial deformation function by using the first registration image and the second registration image as inputs and outputting a deformation field for the first registration image, and a fourth neural network that generates a fourth registration image through the spatial deformation function by using the first registration image and the second registration image as inputs and outputting a deformation field for the second registration image.

The neural network may be trained in an unsupervised manner based on cyclic loss between the third image and the third registration image, cyclic loss between the fourth image and the fourth registration image, registration loss between the third image and the second registration image, registration loss between the fourth image and the first registration image, and identify loss between the third image and the first registration image or identify loss between the fourth image and the second registration image when the third image is identical to the fourth image.

The neural network may be trained based on predefined cyclic loss, registration loss, and identity loss, with respect to a moving image, a fixed image, and a registration image for the moving image and the fixed image.

The neural network may include any one of a neural network based on a convolution framelet and a neural network including a pooling layer and an unpooling layer.

According to an exemplary embodiment, an image registration method includes receiving a first medical image and a second medical image for image registration, outputting a deformation field for the first medical image for registering the first medical image and the second medical image using an unsupervised learning-based neural network with cycle consistency for the deformation field, and generating a registration image for the first image and the second image based on a spatial deformation function using the output deformation field.

According to an exemplary embodiment, an image registration apparatus includes a reception unit that receives a first image and a second image for image registration, and a registration unit that outputs a deformation field for a first image and a second image by using an unsupervised learning-based neural network with cycle consistency for the deformation field, and generates a registration image for the first image and the second image based on a spatial deformation function using the output deformation field.

The registration unit may output the deformation field for the first image for registering the first image and the second image and generate the registration image by applying the deformation field for the first image to the first image using the spatial deformation function, when the first image is a moving image and the second image is a fixed image.

The neural network may include a first neural network that generates a first registration image through the spatial deformation function by using a third image and a fourth image as inputs and outputting a deformation field for the third image, a second neural network that generates a second registration image through the spatial deformation function by using the third image and the fourth image as inputs and outputting a deformation field for the fourth image, a third neural network that generates a third registration image through the spatial deformation function by using the first registration image and the second registration image as inputs and outputting a deformation field for the first registration image, and a fourth neural network that generates a fourth registration image through the spatial deformation function by using the first registration image and the second registration image as inputs and outputting a deformation field for the second registration image.

The neural network may be trained in an unsupervised manner based on cyclic loss between the third image and the third registration image, cyclic loss between the fourth image and the fourth registration image, registration loss between the third image and the second registration image, registration loss between the fourth image and the first registration image, and identify loss between the third image and the first registration image or identify loss between the fourth image and the second registration image when the third image is identical to the fourth image. The neural network may be trained based on predefined cyclic loss, registration loss, and identity loss, with respect to a moving image, a fixed image, and a registration image for the moving image and the fixed image.

The neural network may include any one of a neural network based on a convolution framelet and a neural network including a pooling layer and an unpooling layer.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
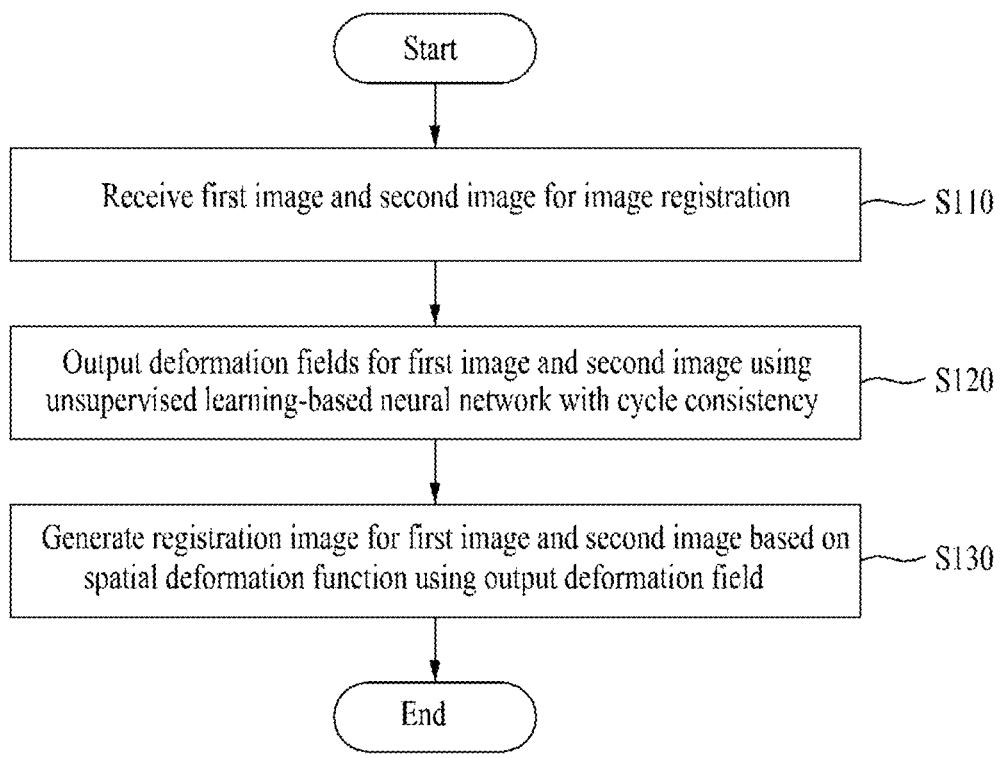
FIG. 1 is an operation flowchart illustrating an image registration method according to an embodiment of the inventive concept.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated features, integers, steps, operations, elements, parts or combinations thereof, But do not preclude the presence or addition of steps, operations, elements, parts, or combinations thereof.

Unless defined otherwise, all terms (including technical and scientific terms) used herein have the same meanings as commonly understood by one of ordinary skill in the art to which this invention belongs. Further, unless explicitly defined to the contrary, the terms defined in a generally-used dictionary are not ideally or excessively interpreted.

Hereinafter, preferred embodiments of the inventive concept will be described in detail with reference to the accompanying drawings. The same reference numerals are used for the same components in the drawings, and duplicate descriptions of the same components are omitted.

Radiologists often diagnose the progress of disease by comparing medical images at different temporal phases. In case of diagnosis of liver tumor such as hepatocellular carcinoma (HCC), the contrast of normal liver tissue and tumor region distinctly varies before and after the infection of contrast agent. This provides radiologists an important clue to diagnose cancers and plan surgery or radiation therapy. However, liver images taken at different phases are usually different in their shape due to disease progress, breathing, patient motion, etc., so image registration is important to improve accuracy of dynamic studies.

Image registration methods according to embodiments are implemented in a variational framework that solves an energy minimization problem over the space of deformations. Since the diffeomorphic image registration ensures the preservation of topology and one-to-one mapping between the source and target images, the algorithmic extensions to large deformation such as LDDMM and SyN have been applied to various image registration studies. However, these approaches usually require substantial time and extensive computation.

To address this issue, recent image registration techniques are based on deep neural networks that instantaneously generate a deformation field. In supervised learning approaches, the ground-truths of the deformation field are required for training neural networks, which are typically generated by the traditional registration method. However, the performance of these existing supervised methods depends on the quality of the ground-truth registration fields, or the existing supervised methods do not explicitly enforce the consistency criterion to uniquely describe the correspondences between two images.

Embodiments of the inventive concept are to generate a registration image in which a moving image is matched to a fixed image by using an unsupervised learning-based neural network with cycle consistency.

Here, the cycle consistency in the inventive concept can improve topology preservation while generating fewer folding problems, and a single neural network of the inventive concept provides deformable registration between every pairs once the network is trained.

FIG. 1 is a flowchart of an image registration method according to an embodiment of the inventive concept.

Referring to FIG. 1, an image registration method according to an embodiment of the inventive concept may include receiving a first image, for example, a moving image, and a second image, for example, a fixed image (S110), the first image and the second image being to be registered.

When the first image and the second image are received in step S110, a deformation field for the first image and the second image is output using an unsupervised learning-based neural network with cycle consistency for the deformation field (S120).

Here, in step S120, when the first image is a moving image and the second image is a fixed image, a deformation field for the first image to register the first image and the second image may be output.

An image registration method of the inventive concept may be learned as an unsupervised learning model by being trained using neural networks including a first neural network that generates a first registration image through a spatial deformation function by using a third image and a fourth image included in the training data set as inputs and outputting a deformation field for the third image, a second neural network that generates a second registration image through a spatial deformation function by using the third image and the fourth image as inputs and outputting a deformation field for the fourth image, a third neural network that generates a third registration image through a spatial deformation function by using the first registration image and the second registration image as inputs and outputting a deformation field for the first registration image, and a fourth neural network that generates a fourth registration image through a spatial deformation function by using the first registration image and the second registration image as inputs and outputting a deformation field for the second registration image.

In this case, the neural network may be trained in an unsupervised manner based on cyclic loss between the third image and the third registration image, cyclic loss between the third image and the third registration image, registration loss between the third image and the second registration image, registration loss between the fourth image and the first registration image, and identify loss between the third image and the first registration image or the fourth image and the second registration image when the third image is identical to the fourth image.

That is, the neural network of the inventive concept may be trained based on predefined cyclic loss, registration loss, and identity loss, with respect to a moving image and a fixed image, and a registration image for the moving image and the fixed image.

Furthermore, the neural network used in the inventive concept may include not only a convolution framelet-based neural network, a neural network including a pooling layer and an unpooling layer, for example, U-Net, but also various types of neural networks applicable to the inventive concept.

A convolutional framelet refers to a method of representing an input signal through local and non-local bases. In order to reveal the black box characteristics of deep convolutional neural networks, a study on a new mathematical theory of deep convolutional framelets (Ye, J C., Han, Y., Cha, E.: Deep convolutional framelets: a general deep learning framework for inverse problems. SIAM Journal on Imaging Sciences 11(2), 991-1048(2018)).

When the deformation field or deformation vector field of the first image is output in step S120, a registration image for the first image and the second image is generated based on a spatial deformation function using the output deformation field (S130).

In this case, in step S130, the registration image may be generated by applying a deformation field for the first image to the first image using a spatial deformation function.

The method of the inventive concept will be described with reference to FIGS. 2 to 4.

Figure 2:
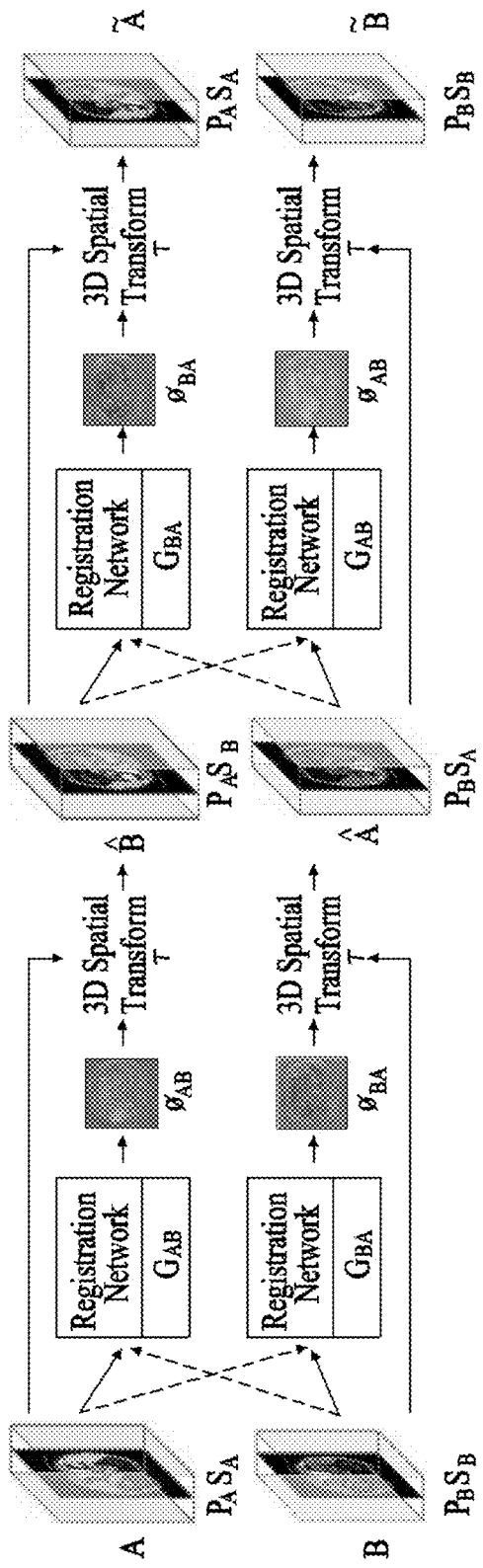
FIG. 2 shows an exemplary diagram of a framework for performing the method of FIG. 1.
Figure 3:
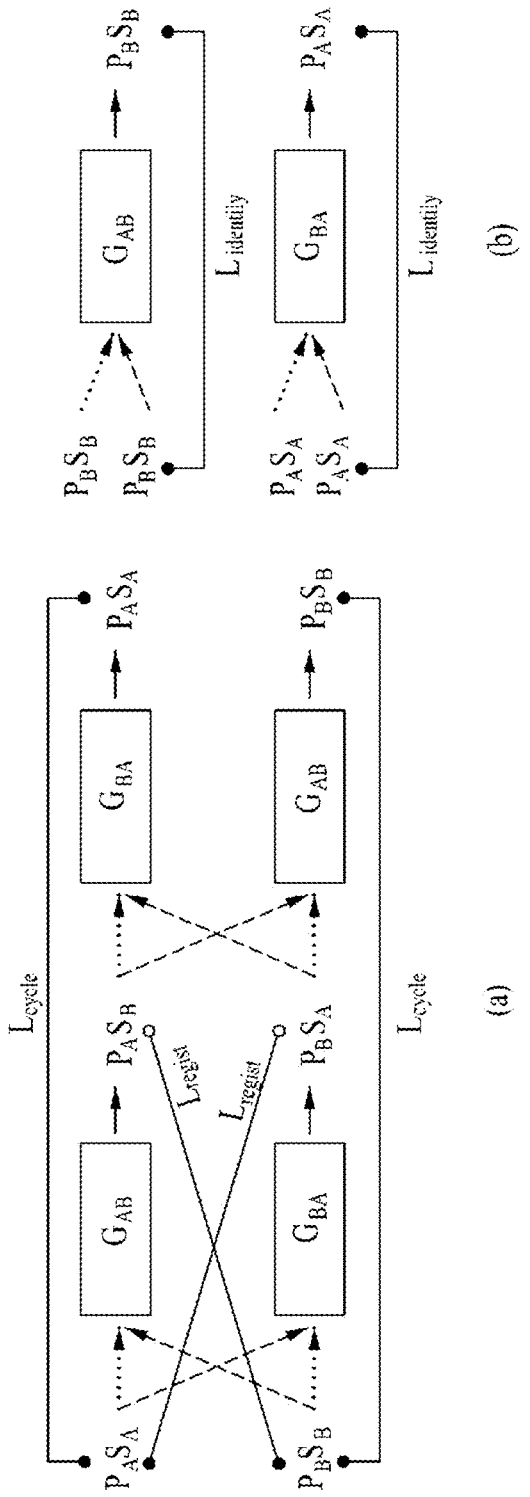
FIG. 3 shows an exemplary diagram for describing a loss for training a neural network used in the method of FIG. 1.

FIG. 2 shows an exemplary diagram of a framework for performing the method of FIG. 1. As shown in FIG. 2, for the input images, A ($P_A S_A$) and B ($P_B S_B$), in different phases, two registration networks are defined as $G_{AB}$: (A,B)→$\varphi_{AB}$ and $G_{BA}$: (B,A)→$\varphi_{BA}$, where $\varphi_{AB}$ (resp. $\varphi_{BA}$) denotes the 3-D deformation field from A to B (resp. B to A). Here, P denotes the phase of the image, for example, the contrast of the image, and S denotes the shape of the image. A and B shown in FIG. 2 may denote images with different phases and shapes. Of course, in the inventive concept, various types of images such as images having the same phase and different shapes and images having the same shape and different phases may be used as inputs.

In the inventive concept, a 3D spatial transformation layer (or spatial transformation function) T of the neural network is used to warp the moving image by the estimated deformation field, so that the registration network is trained to minimize the dissimilarity between the deformed moving source image and a fixed target image. Accordingly, once a pair of images is given to the registration network, the moving images are deformed into fixed images.

To guarantee the topology preservation between the deformed and fixed images, the cycle consistency constraint between the original moving image and its re-deformed image may be adopted. That is, the deformed volumes are given as the inputs to the networks again by switching their order to impose the cycle consistency. This constraint ensures that the shape of deformed images successively returns to the original shape.

The neural network shown in FIG. 2 may include a first neural network ($G_{AB}$) that generates a first registration image ($\hat{B}$) through a spatial deformation function by inputting an image "A" as a moving image and an image "B" as a fixed image and outputting a deformation field ($\varphi_{AB}$) for the image "A", a second neural network ($G_{BA}$) that generates a second registration image ($\hat{A}$) through a spatial deformation function by inputting the image "B" as a moving image and the image "A" as a fixed image and outputting a deformation field ($\varphi_{BA}$) for the image "B", a third neural network ($G_{BA}$) that generates a third registration image ($\tilde{A}$) through a spatial deformation function by inputting the first registration image as a moving image and the second registration image as a fixed image and outputting a deformation field ($\hat{\varphi}_{BA}$) for the first registration image and a fourth neural network ($G_{AB}$) that generates a fourth registration image ($\tilde{B}$) through a spatial deformation function by inputting the second registration image as a moving image and the first registration image as a fixed image and outputting a deformation function ($\hat{\varphi}_{AB}$) for the second registration image. These two neural networks may be trained to maximize similarity between the similarity between the deformed image and the fixed image.

According to the inventive concept, it is possible to train a neural network by solving a loss function as shown in Equation 1 below.

$$\mathcal{L} = \mathcal{L}_{regist}^{AB} + \mathcal{L}_{regist}^{BA} + \alpha \mathcal{L}_{cycle} + \beta \mathcal{L}_{identity} \quad \text{[Equation 1]}$$

where $L_{regist}$, $L_{cycle}$, and $L_{identity}$ denote registration loss, cycle loss, and identity loss, respectively, and $\alpha$ and $\beta$ denotes hyperparameters.

The method of the inventive concept may train a neural network in an unsupervised manner based on this loss function without ground-truth deformation field.

That is, as shown in FIG. 3A, the neural network of the inventive concept may be trained in an unsupervised manner based on cycle loss between $P_AS_A$ and the third registration image ($P_AS_A$) and between $P_BS_B$ and the fourth registration image ($P_BS_B$), registration loss between $P_AS_A$ and the second registration image ($P_AS_A$) and between the $P_BS_B$ and the first registered image ($P_BS_A$) and identity loss between $P_AS_A$ and $P_BS_B$ or between $P_BS_B$ and $P_AS_A$, when two input images are the same image as shown in FIG. 3B. The cycle loss, the registration loss, and the identity loss will be described in more detail as follows.

The registration loss function is based on the energy function of classical variational image registration. For example, the energy function for the registration of moving image A to the target volume B is composed of two terms as in Equation 2:

$$\mathcal{L}_{regist}^{AB} = \mathcal{L}_{sim}(\mathcal{T}(A,\phi), B) + \mathcal{L}_{reg}(\phi) \quad \text{[Equation 2]}$$

where "A" is a moving image, "B" is a fixed image, and "T" denotes a 3D spatial transformation function. $L_{sim}$ computes image dissimilarity between the deformed image by the estimated deformation field p and the fixed image, and $L_{reg}$ evaluates the smoothness of the deformation field. In particular, the cross-correlation may be used as the similarity function to deal with the contrast change during CECT exam, and L2-loss may be used as a regularization function. Therefore, the registration loss function may be written as in Equation 3 below.

$$\mathcal{L}_{regist}^{AB} = -(\mathcal{T}(A,\phi_{AB}) \otimes B) + \lambda \|\phi_{AB}\|_2 \quad \text{[Equation 3]}$$

where ⊗ denotes the cross-correlation defined by Equation 4 below.

$$x \otimes y = \frac{|\langle x - \bar{x}, y - \bar{y}\rangle|^2}{\|x - \bar{x}\|\|y - \bar{y}\|} \quad \text{[Equation 4]}$$

Here, X and Y denote the mean value of x and y, respectively.

The cycle consistency condition is implemented by minimizing the loss function as shown in FIG. 3A. Since an image A is first deformed to an image $\hat{B}$ which is then deformed again by the other network to generate an image $\tilde{A}$, the cyclic consistency imposes $A \cong \tilde{A}$. Similarly, an image B should be successively deformed by the two networks to generate the image $\tilde{B}$. Then, the cycle consistency imposes $B \approx \tilde{B}$. As shown in FIG. 3A, since the neural network of the inventive concept receives both the moving image and the fixed image, the implementation of cycle consistency loss may be given by as the vector-form of cycle consistency condition as in Equation 5 below.

$$\begin{bmatrix} A \\ B \end{bmatrix} \approx \begin{bmatrix} \mathcal{T}(\hat{B}, \hat{\phi}_{BA}) \\ \mathcal{T}(\hat{A}, \hat{\phi}_{AB}) \end{bmatrix} = \begin{bmatrix} \mathcal{T}(\mathcal{T}(A, \phi_{AB}), \hat{\phi}_{BA}) \\ \mathcal{T}(\mathcal{T}(B, \phi_{BA}), \hat{\phi}_{AB}) \end{bmatrix} \quad \text{[Equation 5]}$$

where $(\hat{B}, \hat{A}) := (\mathcal{T}(A, \phi_{AB}), \mathcal{T}(B, \phi_{BA}))$. Thus, cycle consistency may be computed by Equation 6 below.

$$\mathcal{L}_{cycle} = \left\| \begin{bmatrix} \mathcal{T}(\hat{B}, \hat{\phi}_{BA}) \\ \mathcal{T}(\hat{A}, \hat{\phi}_{AB}) \end{bmatrix} - \begin{bmatrix} A \\ B \end{bmatrix} \right\|_1 \quad \text{[Equation 6]}$$

where $\|\cdot\|_1$ denotes the $l_1$-norm.

Another important consideration for the loss function is that the network should not change the stationary regions of the body. That is, the stationary regions should be the fixed points of the network. As shown in FIG. 3B, this constraint can be implemented by imposing that the input image should not be changed when the identical images are used as the floating and reference volume. More specifically, the inventive concept can use the identity loss as shown in Equation 7 below.

$$\mathcal{L}_{identity} = (\mathcal{T}(A, G_{AB}(A,A)) \otimes A) - (\mathcal{T}(B, G_{BA}(B,B)) \otimes B) \quad \text{[Equation 7]}$$

By minimizing the identity loss of Equation 7, the cross-correlation between the deformed image and the fixed image can be maximized. Thus, the identity loss may guide the stability of the deformable field estimation in stationary regions.

The inventive concept can adopt VoxelMorph-1 as a baseline network to generate a displacement vector field in width, height and depth directions. The model of the inventive concept without both cycle and identity losses may be equivalent to VoxelMorph-1. The 3D network consists of encoders, decoders, and skip connections similar to U-Net.

The 3D spatial transformation layer is to deform the moving volume with the deformation field (p, and the spatial transformation function T may be used with trilinear interpolation to warp the image A by ϕ, which can be expressed as shown in Equation 8 below.

$$\mathcal{T}(A,\phi) = \sum_{y \in N(x+\phi(x))} A(y) \Pi_{d \in \{i,j,k\}} (1 - |x_d + \phi(x_d) - y_d|) \quad \text{[Equation 8]}$$

where x denotes the voxel index, N(x+φ(x)) denotes an 8-voxel cubic neighborhood around x+φ(x), and d is three directions in 3D image space.

Figure 4:
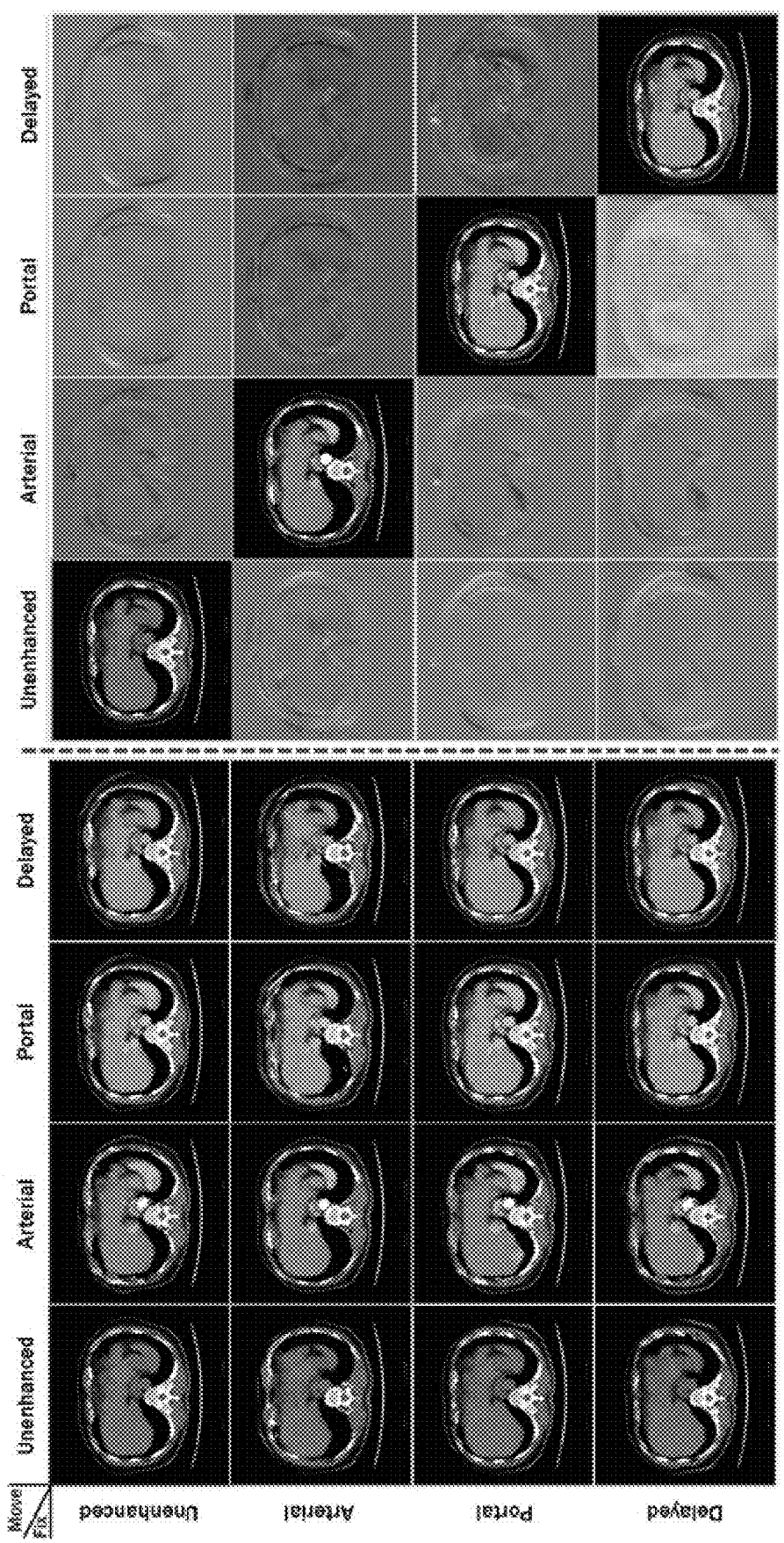
FIG. 4 shows an exemplary diagram of registration results and a deformation vector field according to the method of the inventive concept.

FIG. 4 shows an example of registration results (a) by the method of the inventive concept and the deformation vector field (b), and shows an exemplary view for multiphase 3D abdominal CT image registration.

As can be seen from FIG. 4, when image registration is performed by the method of the inventive concept, image registration is possible within a very short time with similar registration accuracy compared to the conventional method, and has higher accuracy than the unsupervised learning-based image registration technique, which can be seen through the quantification index of the image deformation vector field. In addition, it can be seen that registration is possible for all images having different image contrasts using a single neural network trained by the method of the inventive concept, and its performance is also very good.

As described above, the method according to an embodiment of the inventive concept may generate a registration image in which a moving image is deformed into a fixed image by using an unsupervised learning-based neural network with cycle consistency.

The method according to an embodiment of the inventive concept can reduce the amount of computation and time for image registration, and can also have high registration accuracy without loss of image information.

The method according to an embodiment of the inventive concept can provide an unsupervised learning-based image registration technique using a neural network with cycle consistency, for example, a convolutional neural network (CNN), and the cyclic constraint in the inventive concept is applied to the deformed image itself, thus increasing the topology preservation performance of the original image (before deformation). In addition, the neural network in the inventive concept can be applied to various moving/fixed image domains such as multiphase CT images. Accordingly, in a case where the neural network training is completed, image registration may be computed within a short time when the neural network receives any pair of new images.

In the field of computer vision, the method of the inventive concept may be applied to transform, into one coordinate system, images obtained by photographing one moving target through a fixed camera with a time difference or images obtained by photographing one fixed target through a moving camera with a time difference. In the medical field, the method of the inventive concept may be applied to images taken with a time difference by various imaging devices, such as CT and MRI, as an image registration technique. Because the position and shape of anatomical structures in an image may vary depending on the patient's movement or the progression of the lesion, the inventive concept may be applied to increase the accuracy in planning disease diagnosis and treatment through multiple images.

Figure 5:
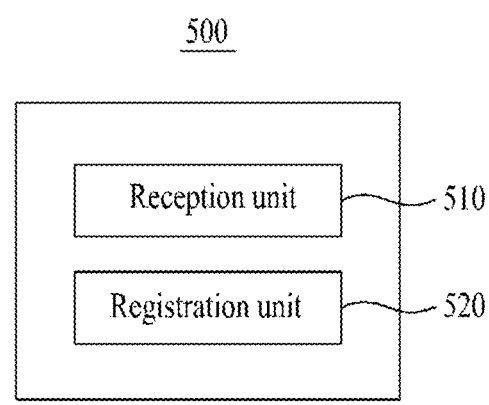
FIG. 5 shows a configuration of an image registration apparatus according to an embodiment of the inventive concept.

FIG. 5 illustrates a configuration of an image registration device according to an embodiment of the present disclosure, and illustrates a conceptual configuration of an apparatus for performing the methods of FIGS. 1 to 4.

Referring to FIG. 5, an image registration device according to an embodiment of the inventive concept includes a reception unit 510 and a registration unit 520. The reception unit 510 may include receiving a first image for registration, for example, a moving image, and a second image, for example, a fixed image.

The registration unit 520 may output a deformation field for a first image and a second image by using an unsupervised learning-based neural network having cycle consistency for the deformation field, and generate a registration image for the first image and the second image based on a spatial deformation function using the output deformation field.

In this case, when the first image is a moving image and the second image is a fixed image, the registration unit 520 may output the deformation field for the first image for registering the first image and the second image and generate the registration image by applying the deformation field for the first image to the first image using the spatial deformation function.

The neural networks may include a first neural network that generates a first registration image through the spatial deformation function by using a third image and a fourth image included in the training data set as inputs and outputting a deformation field for the third image, a second neural network that generates a second registration image through the spatial deformation function by using the third image and the fourth image as inputs and outputting a deformation field for the fourth image, a third neural network that generates a third registration image through the spatial deformation function by using the first registration image and the second registration image as inputs and outputting a deformation field for the first registration image, and a fourth neural network that generates a fourth registration image through the spatial deformation function by using the first registration image and the second registration image as inputs and outputting a deformation field for the second registration image.

The neural network may be trained in an unsupervised manner based on cyclic loss between the third image and the third registration image, cyclic loss between the third image and the third registration image, registration loss between the third image and the second registration image, registration loss between the fourth image and the first registration image, and identify loss between the third image and the first registration image or the fourth image and the second registration image when the third image is identical to the fourth image.

The neural network may include any one of a neural network based on a convolution framelet and a neural network including a pooling layer and an unpooling layer.

Although the description is omitted with reference to the apparatus of FIG. 5, components constituting FIG. 5 may include all the contents described with reference to FIGS. 1 to 4, which are obvious to those skilled in the art.

The apparatus described herein may be implemented with hardware components and software components and/or a combination of the hardware components and the software components. For example, the apparatus and components described in the embodiments may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of executing and responding to instructions. The processing device may run an operating system (OS) and one or more software applications that run on the OS. The processing device also may access, store, manipulate, process, and create data in response to execution of the software. For convenience of understanding, one processing device is described as being used, but those skilled in the art will appreciate that the processing device includes a plurality of processing elements and/or multiple types of processing elements. For example, the processing device may include multiple processors or a single processor and a single controller. In addition, different processing configurations are possible, such a parallel processors.

The software may include a computer program, a piece of code, an instruction, or some combination thereof, for independently or collectively instructing or configuring the processing device to operate as desired. Software and/or data may be embodied in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the inventive concept, or they may be of the kind well-known and available to those having skill in the computer software arts. Examples of computer readable recording media include magnetic media such as hard disks, floppy disks and magnetic tape, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved.

Therefore, other implementations, other embodiments, and equivalents to the claims are within the scope of the following claims.

According to embodiments of the inventive concept, it is possible to generate a registration image obtained by registering a moving image and a fixed image using an unsupervised learning-based neural network with cycle consistency.

According to embodiments of the inventive concept, it is possible to reduce the amount of computation and time for image registration, and also have high registration accuracy without loss of image information.

In the field of computer vision, the inventive concept may be applied to transform, into one coordinate system, images obtained by photographing one moving target through a fixed camera with a time difference or images obtained by photographing one fixed target through a moving camera with a time difference. In the medical field, the method of the inventive concept may be applied to images taken with a time difference by various imaging devices, such as CT and MRI, as an image registration technique. Because the position and shape of anatomical structures in an image may vary depending on the patient's movement or the progression of the lesion, the inventive concept may be applied to increase the accuracy in planning disease diagnosis and treatment through multiple images.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An image registration method comprising:
   receiving a first image and a second image for image registration;
   outputting a deformation field for the first image and the second image using an unsupervised learning-based neural network with cycle consistency for the deformation field; and
   generating a registration image for the first image and the second image based on a spatial deformation function using the output deformation field,
   wherein the neural network includes:
      a first neural network that generates a first registration image through the spatial deformation function by using a third image and a fourth image as inputs and outputting a deformation field for the third image,
      a second neural network that generates a second registration image through the spatial deformation function by using the third image and the fourth image as inputs and outputting a deformation field for the fourth image,
      a third neural network that generates a third registration image through the spatial deformation function by using the first registration image and the second registration image as inputs and outputting a deformation field for the first registration image, and
      a fourth neural network that generates a fourth registration image through the spatial deformation function by using the first registration image and the second registration image as inputs and outputting a deformation field for the second registration image,
   wherein the neural network is trained in an unsupervised manner based on cyclic loss between the third image and the third registration image, cyclic loss between the fourth image and the fourth registration image, registration loss between the third image and the second registration image, registration loss between the fourth image and the first registration image, and identify loss between the third image and the first registration image or identify loss between the fourth image and the second registration image when the third image is identical to the fourth image.

2. The image registration method of claim 1, wherein the outputting of the deformation field includes outputting the deformation field for the first image for registering the first image and the second image may be output, when the first image is a moving image and the second image is a fixed image, and
   wherein the generating of the registration image includes generating the registration image by applying the deformation field for the first image to the first image using the spatial deformation function.

3. The image registration method of claim 1, wherein the neural network is trained based on predefined cyclic loss, registration loss, and identity loss, with respect to a moving image, a fixed image, and a registration image for the moving image and the fixed image.

4. The image registration method of claim 1, wherein the neural network includes any one of a neural network based on a convolution framelet and a neural network including a pooling layer and an unpooling layer.

5. An image registration method comprising:
   receiving a first medical image and a second medical image for image registration;
   outputting a deformation field for the first medical image for registering the first medical image and the second medical image using an unsupervised learning-based neural network with cycle consistency for the deformation field; and
   generating a registration image for the first image and the second image based on a spatial deformation function using the output deformation field,
   wherein the neural network includes:
      a first neural network that generates a first registration image through the spatial deformation function by using a third medical image and a fourth medical image as inputs and outputting a deformation field for the third medical image, a second neural network that generates a second registration image through the spatial deformation function by using the third medical image and the fourth medical image as inputs and outputting a deformation field for the fourth medical image, a third neural network that generates a third registration image through the spatial deformation function by using the first registration image and the second registration image as inputs and outputting a deformation field for the first registration image, and a fourth neural network that generates a fourth registration image through the spatial deformation function by using the first registration image and the second registration image as inputs and outputting a deformation field for the second registration image, wherein the neural network is trained in an unsupervised manner based on cyclic loss between the third medical image and the third registration image, cyclic loss between the fourth medical image and the fourth registration image, registration loss between the third medical image and the second registration image, registration loss between the fourth medical image and the first registration image, and identify loss between the third medical image and the first registration image or identify loss between the fourth medical image and the second registration image when the third medical image is identical to the fourth medical image.

6. An image registration apparatus comprising:

a reception unit configured to receive a first image and a second image for image registration; and a registration unit configured to output a deformation field for a first image and a second image by using an unsupervised learning-based neural network with cycle consistency for the deformation field, and generate a registration image for the first image and the second image based on a spatial deformation function using the output deformation field, wherein the neural network includes:

a first neural network that generates a first registration image through the spatial deformation function by using a third image and a fourth image as inputs and outputting a deformation field for the third image, a second neural network that generates a second registration image through the spatial deformation function by using the third image and the fourth image as inputs and outputting a deformation field for the fourth image, a third neural network that generates a third registration image through the spatial deformation function by using the first registration image and the second registration image as inputs and outputting a deformation field for the first registration image, and a fourth neural network that generates a fourth registration image through the spatial deformation function by using the first registration image and the second registration image as inputs and outputting a deformation field for the second registration image, wherein the neural network is trained in an unsupervised manner based on cyclic loss between the third image and the third registration image, cyclic loss between the fourth image and the fourth registration image, registration loss between the third image and the second registration image, registration loss between the fourth image and the first registration image, and identify loss between the third image and the first registration image or identify loss between the fourth image and the second registration image when the third image is identical to the fourth image.

7. The image registration apparatus of claim 6, wherein the registration unit outputs the deformation field for the first image for registering the first image and the second image and generates the registration image by applying the deformation field for the first image to the first image using the spatial deformation function, when the first image is a moving image and the second image is a fixed image.

8. The image registration apparatus of claim 6, wherein the neural network is trained based on predefined cyclic loss, registration loss, and identity loss, with respect to a moving image, a fixed image, and a registration image for the moving image and the fixed image.

9. The image registration apparatus of claim 6, wherein the neural network includes any one of a neural network based on a convolution framelet and a neural network including a pooling layer and an unpooling layer.

\* \* \* \* \*